United States Patent
Daudin et al.

(10) Patent No.: US 9,644,154 B2
(45) Date of Patent: May 9, 2017

(54) OPTIMIZED METHOD FOR RECYCLING BIO-OILS INTO HYDROCARBON FUELS

(71) Applicant: IFP ENERGIES NOUVELLES, Rueil-Malmaison (FR)

(72) Inventors: Antoine Daudin, Corbas (FR); Alain Quignard, Roussillon (FR); Olivier Thinon, Roanne (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 176 days.

(21) Appl. No.: 14/383,914

(22) PCT Filed: Feb. 26, 2013

(86) PCT No.: PCT/FR2013/050389
§ 371 (c)(1),
(2) Date: Sep. 9, 2014

(87) PCT Pub. No.: WO2013/135986
PCT Pub. Date: Sep. 19, 2013

(65) Prior Publication Data
US 2015/0065764 A1    Mar. 5, 2015

(30) Foreign Application Priority Data
Mar. 12, 2012   (FR) ..................... 12 00744

(51) Int. Cl.
| | | |
|---|---|---|
| *C10G 65/02* | (2006.01) | |
| *C10G 65/12* | (2006.01) | |
| *C10G 65/04* | (2006.01) | |
| *C08H 8/00* | (2010.01) | |
| *C10G 3/00* | (2006.01) | |
| *C10G 45/00* | (2006.01) | |
| *C10G 47/00* | (2006.01) | |
| *B01J 37/20* | (2006.01) | |
| *B01J 21/04* | (2006.01) | |
| *B01J 21/18* | (2006.01) | |
| *B01J 23/86* | (2006.01) | |
| *B01J 23/883* | (2006.01) | |
| *B01J 37/00* | (2006.01) | |
| *C10G 1/00* | (2006.01) | |

(52) U.S. Cl.
CPC ............ *C10G 65/043* (2013.01); *B01J 21/04* (2013.01); *B01J 21/18* (2013.01); *B01J 23/866* (2013.01); *B01J 23/883* (2013.01); *B01J 37/0009* (2013.01); *B01J 37/20* (2013.01); *C08H 8/00* (2013.01); *C10G 1/002* (2013.01); *C10G 3/46* (2013.01); *C10G 3/48* (2013.01); *C10G 3/50* (2013.01); *C10G 45/00* (2013.01); *C10G 47/00* (2013.01); *C10G 65/12* (2013.01); *C10G 2300/4081* (2013.01); *Y02P 30/20* (2015.11)

(58) Field of Classification Search
CPC ...... C10G 65/043; C10G 65/02; C10G 65/12; C10G 1/002
USPC ........................................ 585/242, 240, 251
See application file for complete search history.

(56) References Cited

U.S. PATENT DOCUMENTS

| | | | |
|---|---|---|---|
| 4,411,768 A | 10/1983 | Unger et al. | |
| 8,329,968 B2 | 12/2012 | Brandvold et al. | |
| 8,748,680 B2 | 6/2014 | Hogendoorn et al. | |
| 2009/0294324 A1* | 12/2009 | Brandvold ............... | C10L 1/04 208/17 |
| 2011/0119994 A1 | 5/2011 | Hogendoorn et al. | |

FOREIGN PATENT DOCUMENTS

WO       2012035410 A2     3/2012

OTHER PUBLICATIONS

Mohan et al., Pyrolysis of wood/biomass for bio-oil: A critical review, 2006, Energy and Fuels, vol. 20, pp. 848-889.*
International Search Report from PCT/FR2013/050389 dated May 22, 2013.
Preliminary Search Report from corresponding Priority Application No. FR 1200744 dated Nov. 27, 2012.
Green Car Congress "Dynamotive Produces Renewable Gasoline and Diesel from Biomass in Three-Stage Process: Pyrolysis, Hydroreforming, Hydrotreating" [Apr. 2009], URL: http://www.greencarcongress.com/2009/04/dynamotive-bingo-20090425.html.
Colombian Office Action dated Sep. 29, 2016 issued in corresponding 14224583, 9 pages.

\* cited by examiner

*Primary Examiner* — In Suk Bullock
*Assistant Examiner* — Youngsul Jeong
(74) *Attorney, Agent, or Firm* — Millen White Zelano & Branigan, P.C.

(57) ABSTRACT

A process for the production of hydrocarbon products from a feed comprising at least one non-pre-treated bio-oil, comprising a first step for hydroreforming in the presence of hydrogen and a hydroreforming catalyst, used alone or as a mixture, to obtain at least one liquid effluent comprising at least one aqueous phase and at least one organic phase, a second step in which at least a portion of the organic phase of the effluent obtained from the first hydroreforming step is recycled to the first hydroreforming step with a recycle ratio equal to the ratio of the mass flow rate of said organic phase to the mass flow rate of the non-pre-treated bio-oil in the range 0.05 to 2 and in which the hydrocarbon effluent obtained from the hydrotreatment and/or hydrocracking step is not recycled to said first hydroreforming step.

14 Claims, No Drawings

OPTIMIZED METHOD FOR RECYCLING BIO-OILS INTO HYDROCARBON FUELS

FIELD OF THE INVENTION

The present invention relates to a process for the production of hydrocarbon products, in particular chemical products and/or hydrocarbon products which can be incorporated into the pool of liquid fuels known as biofuels, from liquids obtained from biomass and in particular from liquefied biomass obtained from the pyrolysis of biomass, also known as bio-oil. More specifically, the invention relates to a process for upgrading bio-oils into hydrocarbon products which can be incorporated into the liquid gasoline pool for engines for air, sea or land transport, by means of a two-step catalytic process, said process comprising a hydroreforming step followed by a hydrotreatment and/or hydrocracking and/or hydroconversion step.

PRIOR ART

Bio-oils are liquid products obtained by thermochemical liquefaction of cellulosic biomass. Thermochemical processes generally convert the biomass into liquid, gaseous and solid products. Of such processes, those known as fast pyrolysis tend to maximize the liquid yield. During fast pyrolysis, the temperature of the biomass, which may be finely divided, is rapidly raised to values of more than approximately 300° C., and preferably in the range 300° C. to 900° C., and the liquid products obtained are condensed into the form of bio-oil. Ringer et al. (*Large-Scale Pyrolysis Oil Production: A Technology Assessment and Economic Analysis*, M. Ringer, V. Putsche, and J. Scahill, NREL Technical Report NREL/TP-510-37779, November 2006) studied the various technologies employed for large-scale fast biomass pyrolysis. They include ebullated fluidized beds, moving fluidized beds, ablative pyrolysis reactors, vacuum pyrolysis and rotating cone pyrolysis.

At first sight, the bio-oils obtained from the fast pyrolysis of biomass could in principle provide renewable liquid fuels at low cost; in fact, they have been described for use as a fuel for boilers, stationary gas turbines and diesel engines. In addition, fast pyrolysis has been developed industrially on a relatively large scale of the order of several hundred tonnes per day. However, this technology has not yet enjoyed much commercial interest.

A bio-oil, in particular a bio-oil obtained from the fast pyrolysis of biomass, is a complex mixture of polar, highly oxygenated hydrocarbon products obtained from the breakdown of biopolymers, and has physical and chemical properties which limit its direct use as a biofuel.

Pyrolysis bio-oils have undesirable properties, such as: (1) corrosivity due to their high water and organic acid content; (2) a low specific heat value due to the high oxygen content, typically of the order of 40% by weight; (3) chemical instability due to the abundance of reactive functional groups such as the carbonyl group, which could result in polymerization during storage and resulting phase separation; (4) a relatively high viscosity and tendency for phase separation under high shear conditions, for example in an injector; (5) an incompatibility with conventional hydrocarbon-based fuels due to their insolubility therein; (6) solid particles of carbon obtained from pyrolysis, which will still be present in unfiltered bio-oils to a greater or lesser extent, which can cause clogging of the injectors and pipes. All of these aspects combine to make handling, transport, storage and use of bio-oils difficult and expensive, meaning that integrating them into existing heat and energy production systems and technologies is problematic.

The economic viability of the production of bio-oils for energy applications therefore depends on discovering suitable methods for upgrading them into a liquid fuel with a high quality at a sufficiently low cost. In fact, during recent years considerable effort has been expended in the development of practical technologies which can overcome some or all of the disadvantages mentioned above.

One of the proposed approaches consists of esterifying and acetylating the bio-oils with alcohols such as ethanol or butanol such as, for example, in patent application EP 0 718 392. However, the reaction products still have a high acidity and high water content, while the increase in the heat value is small. In addition, the products themselves tend to be chemically unstable and reactive.

Another approach consists of emulsifying the bio-oil to form diesel fuels using appropriate surfactants such as, for example, in patent U.S. Pat. No. 5,820,640. Although the problems of compatibility with industrial hydrocarbon fuels are solved this way, new problems arise such as the stability of the emulsion, while those linked to corrosivity and chemical stability subsist.

In yet another approach, the uncondensed bio-oil vapours obtained from fast catalytic pyrolysis of the solid biomass are partially deoxygenated by transformation in the presence of zeolitic catalysts in order to directly produce low molecular weight aromatics such as BTX (benzene, toluene, xylene) such as, for example, in patent U.S. Pat. No. 4,308,411. However, the zeolitic catalysts are acidic and a large part of the oxygen is eliminated by dehydration to produce water. As a consequence, because of the inherent molar insufficiency of hydrogen with respect to the oxygen and carbon in the bio-oil, the organic liquid fraction yields are relatively low and very substantial coke formation is observed, which increases the technological difficulty and affects the economic performance.

An indirect approach consists of gasifying the bio-oil (and/or the carbonization co-product) to form synthesis gas, then carrying out a Fischer-Tropsch synthesis of the long chain hydrocarbons or olefins obtained from synthesis gas in the context of a BTL (Biomass To Liquid) process (for example the Bioliq process described by Henrich et al. (*Cost estimate for biosynfuel production via biosyncrude gasification*, E. Henrich, N. Dahmen and E. Dinjus, Biofuels, Bioprod. Bioref. 3:28-41 (2009)). The overall yields of hydrocarbons from biomass are relatively low, however, and the investment costs are high. In addition, the minimum volumes from which BTL processes are expected to be economic are high compared with the typical local availability of biomass, which means that logistics are complex as regards supplying the biomass, with significant transport costs.

Over the last twenty years, the approach consisting of carrying out a direct hydrotreatment of the bio-oil with a view to converting it to stable oxygen-containing liquids or hydrocarbons has been the subject of intensive study. Elliott published a detailed study of these many historical developments, including the work carried out with model compounds known to be present in the bio-oils (*Historical Developments in Hydroprocessing BioOils*, D. C. Elliott, Energy & Fuels 2007, 21, 1792-1815).

One of the major obstacles to the direct catalytic hydrotreatment of bio-oils is their propensity to polymerize when they are subjected to temperatures of more than approximately 100° C., which gives rise to the formation of solids at temperatures of more than about 140° C., with consequences such as clogging of the feed lines, furnaces and reactors as well as fast deactivation of the catalyst, or even clogging of the reactor inlet.

These difficulties can be overcome in part by hydrotreating only the heat-resistant portion of the bio-oil. Thus, by adding water to the bio-oil, it can be separated into an aqueous phase and a viscous phase with a greater density, generally in the range 20% to 30% higher, known as pyrolytic lignin as it is mostly derived from the lignic fraction of the pyrolysis feed of the biomass. Since pyrolytic lignin is rich in phenolic material, it has a much greater thermal stability than that of the portion of the bio-oil derived from carbohydrates, and as a consequence it is easier for it to undergo catalytic hydrotreatment without the formation of solids. This is the approach followed by Piskorz et al. (*Conversion of Lignins to Hydrocarbon Fuels*, J. Piskorz, P. Majerski, D. Radlein, and D. S. Scott, Energy & Fuels, Vol 3, 723-726, 1989) and, more recently, by Marker and Petri in the patent U.S. 7,578,927. That process suffers from the disadvantage of involving a step for separation of the bio-oil upstream of the catalytic hydrotreatment step and the need to treat the resulting two fractions separately. Thus, the resulting process is complex and carrying it out involves mass and energy yield losses as well as high operating costs.

The hydrotreatment of complete bio-oil, i.e. which has not undergone any prior separation step, has been envisaged. Patent U.S. Pat. No. 4,795,841 proposes a two-step hydrotreatment process for complete bio-oil, the bio-oil being used alone, i.e. not mixed with other streams, in the first step of which the overall thermal stability of the bio-oil is improved by catalytic hydrogenation at a temperature approximately equal to 250° C.

However, that two-step hydrotreatment process involves the formation of solids and fast deactivation of the catalyst. Hydrotreatment of the bio-oils is also difficult because multiple organic phases are formed in addition to the aqueous phase. Further, the hydrogenation kinetics are slow, especially at the relatively low temperatures required for thermal stabilization of the bio-oils. Moreover, the hydrogen consumption is high.

Patent application US-2009/0.253.948 discloses a process for the conversion of pyrolysis oil derived from biomass into a liquid fuel using a two-step deoxygenation of the pyrolysis oil and separation of the products, in which the final hydrocarbon product as well as the fractions obtained from the final distillation and boiling at boiling points corresponding to the fractions which can be upgraded in the gasoline, kerosene and gas oil pools, can be recycled. However, it does not disclose a high degree of dispersion or dissolution of the pyrolysis oil in a hydrocarbon medium, with the advantages of a large increase in the reaction rates and the lifetime of the catalyst.

However, an effective hydrotreatment process has still not been discovered. The difficulties encountered arise from the rapid thermal polymerization of the bio-oil, which leads to clogging of the lines and the reaction equipment as well as to rapid deactivation of the catalyst. In other words, at the temperatures typically required for hydrotreatment of the bio-oils, the polymerization reactions are substantially faster than the hydrotreatment reactions, which finally results in the formation of coke.

Thus, there is a need for an improved process for the hydrotreatment of bio-oils which minimizes the formation of solids, deactivation of the catalyst and hydrogen consumption and maximizes the yield of deoxygenated oil produced. Maximizing the fraction of the hydrocarbon product with a boiling point in the boiling range of useful fuels such as gasoline, kerosene or gas oil is also desirable.

SUMMARY OF THE INVENTION

The present invention concerns a process for the production of hydrocarbon products from a feed comprising at least one non-pre-treated bio-oil, said feed being introduced in at least the following steps:
  a first step for hydroreforming in the presence of hydrogen and a hydroreforming catalyst comprising at least one transition metal selected from elements from groups 3 to 12 of the periodic classification of the elements and at least one support selected from activated carbon, silicon carbides, silicas, transition aluminas, silica-aluminas, zirconium oxide, cerium oxide, titanium oxide and transition metal aluminates, used alone or as a mixture, in order to obtain at least one liquid effluent comprising at least one aqueous phase and at least one organic phase;
  a second step for hydrotreatment and/or hydrocracking of at least a portion of the organic phase of the effluent obtained from the first hydroreforming step in order to obtain a hydrocarbon effluent;
in which at least a portion of the organic phase of the effluent obtained from the first hydroreforming step is recycled to said first hydroreforming step as a mixture with said feed comprising at least one bio-oil, with a recycle ratio equal to the ratio of the mass flow rate of said organic phase to the mass flow rate of the non-pre-treated bio-oil in the range 0.05 to 2 and in which the hydrocarbon effluent obtained from the hydrotreatment and/or hydrocracking step is not recycled to said first hydroreforming step.

One advantage of the present invention is that it provides a two-step process for the production of a stable hydrocarbon effluent which can be incorporated into the fuel pool, starting from a feed comprising at least one non-pre-treated bio-oil, comprising an oxygen content of less than 5%, preferably less than 1% by weight, and a water content of less than 0.1% by weight with respect to the total mass of said hydrocarbon effluent, without any significant formation of coke or bio-oil polymers, with low rates of deactivation of the hydroreforming catalyst, substantially improved rates of conversion and a reduced hydrogen consumption.

Another advantage of the present invention is that a feed comprising at least one bio-oil which has not undergone a pre-treatment step is treated. The operating costs of the process of the invention are thus reduced.

Another advantage of the present invention is that a process is provided which is highly flexible as regards the nature of the liquids derived from biomass which can be used as a feed comprising at least one non-pre-treated bio-oil, in particular liquids obtained from pyrolysis of the biomass, which may have wide ranges of viscosity, water content and degree of polymerization, depending on the origin of the biomass and the pyrolysis process carried out.

The inventive process disclosed here satisfies all of these criteria.

DETAILED DESCRIPTION OF THE INVENTION

In accordance with the invention, the bio-oil of the feed treated in the process of the invention is not pre-treated, i.e. said bio-oil has not undergone any pre-treatment steps other than pyrolysis. In particular, said bio-oil has not undergone any pre-treatment step intended to reduce its metals content, its solids content, its water content or its acid content.

A bio-oil is a complex mixture of oxygen-containing compounds obtained by the breakdown of biopolymers present in the original biomass. In the case of lignocellulosic biomass, the structures obtained from these three principal components, cellulose, hemicellulose and lignin, are well represented by the components of the bio-oil.

In particular, a bio-oil is a polar, high-oxygen content hydrocarbon product which generally comprises at least 10% by weight of oxygen, preferably 10% to 60% by weight, and more preferably 20% to 50% by weight of oxygen with respect to the total mass of said bio-oil. In general, the oxygen-containing compounds are alcohols, aldehydes, esters, ethers, organic acids and aromatic oxygen-containing compounds. A portion of the oxygen is present in the form of free water representing at least 5% by weight, preferably at least 10% by weight and more preferably at least 20% by weight of the bio-oil. These properties render the bio-oil completely immiscible with hydrocarbons, even with aromatic hydrocarbons, which generally contain little or no oxygen.

The bio-oils are advantageously obtained from biomass, preferably selected from plants, grasses, trees, wood shavings, seeds, fibres, grain husks, aquatic plants, hay and other sources of lignocellulosic materials such as, for example, those obtained from municipal waste, agro-alimentary waste, forest waste, logging waste, agricultural and industrial waste (such as sugar cane bagasse, waste from oil palm cultivation, sawdust or straw, for example). The bio-oils may also be obtained from paper pulp and paper by-products which may or may not have been recycled, or by-products obtained from paper mills.

The bio-oils are advantageously obtained by thermochemical liquefaction of the biomass, preferably by pyrolysis, and preferably by fast pyrolysis, slow pyrolysis or catalyst-free pyrolysis (in the presence of a catalyst, this is known as catalytic pyrolysis). Pyrolysis is a thermal decomposition in the absence of oxygen, with the feeds being thermally cracked into gases, liquids and solids. A catalyst may advantageously be added to reinforce conversion during pyrolysis; this is termed catalytic pyrolysis. Catalytic pyrolysis generally provides a bio-oil with an oxygen content which is lower than that of the bio-oil obtained by thermal decomposition, but the bio-oil yield is generally lower. The selectivity between the gas, the liquid and the solid depends on the reaction temperature and the residence time of the vapour. Biomass pyrolysis processes, in particular fast pyrolysis, have been described in detail in the literature, for example in A V Bridgewater, H Hofbauer and S van Loo, *Thermal biomass conversion*, CPL Press, 2009, 37-78.

Slow pyrolysis is advantageously carried out at a temperature in the range 350° C. to 450° C., preferably of the order of 400° C., and with a long residence time of between a few minutes and several hours which favours the production of a solid product also known as the carbonization product or wood charcoal. In particular, slow pyrolysis can generally be used to produce 35% by weight of gas, 30% by weight of liquid and 35% by weight of carbonization product. Gasification processes operating at very high temperatures, preferably over 800° C., favour the production of gas, and in particular more than 85% by weight of gas. Intermediate pyrolysis is advantageously carried out at a temperature which is generally in the range 450° C. to 550° C. and with a residence time for the vapour which is short, preferably in the range 10 to 20 seconds, which favours the liquid yield. In particular, intermediate pyrolysis can generally be used to produce 30% by weight of gas, 50% by weight of liquid and 20% by weight of carbonization product.

Fast pyrolysis is advantageously carried out at a temperature which is generally in the range 450° C. to 550° C. and with a very short vapour residence time, preferably in the range 0.5 to 2 seconds, which maximizes the liquid yield: in particular, fast pyrolysis can generally be used to produce 10-20% by weight of gas, 60-75% by weight of liquid and 10-20% by weight of carbonization product. The highest liquid yields are thus obtained in the context of fast pyrolysis processes with a yield of liquids which can be as high as 75% by weight.

Preferably, the bio-oils employed in the process of the present invention are obtained by fast pyrolysis of the biomass.

The feed treated in the process of the invention preferably comprises a bio-oil content in the range 10% to 100% by weight with respect to the total mass of said feed.

The feed comprising at least one non-pre-treated bio-oil used in the process of the invention may also advantageously contain other compounds obtained from the biomass, said compounds advantageously being selected from vegetable oils, oils from algae or algal oils, fish oils, fats of vegetable or animal origin, alcohols obtained from the fermentation of biomass sugars, or mixtures of such feeds, pre-treated or otherwise. The vegetable oils or the oils derived from animal fats essentially comprise triglyceride type chemical structures which the skilled person also knows as fatty acid triesters, as well as free fatty acids, the fatty chains of which contain a number of carbon atoms in the range 9 to 25.

Said vegetable oils may advantageously be crude or refined, completely or partially, and obtained from plants selected from rape, sunflower, soy, palm, olive, coconut, coprah, castor, cotton, peanut oils, linseed oil and crambe oil and any oils obtained, for example, from sunflower or rape by genetic modification or hybridization, this list not being limiting. Said animal fats are advantageously selected from pig fat and fats composed of residues from the food industry or obtained from catering industries. Frying oil, various animal oils such as fish oils, tallow or suet may also be used.

Said feed comprising at least one bio-oil may also advantageously be treated as a mixture with at least one hydrocarbon feed obtained from oil and/or coal. The hydrocarbon feed derived from oil may advantageously be selected from straight run vacuum distillates, vacuum distillates obtained from a conversion process such as those obtained from cokefaction processes, fixed bed hydroconversion processes or ebullated bed processes for the hydrotreatment of heavy fractions, products obtained from fluid catalytic cracking units such as, for example, light cycle oil (LCO) of various origins, heavy cycle oil (HCO) of various origins and any fluid catalytic cracking distillate generally having a distillation range from approximately 150° C. to approximately 370° C., aromatic extracts and paraffins obtained during the preparation of lubricating oils and solvent deasphalted oils, used alone or as a mixture. The hydrocarbon feed derived from coal may advantageously be selected from products obtained from the liquefaction of coal and aromatic fractions obtained from the pyrolysis or gasification of coal and shale oils or products derived from shale oils, alone or as a mixture, pre-treated or otherwise.

If hydrogen is produced internally during the step for hydroreforming the feed comprising at least one bio-oil, the hydrogen consumption for co-treatment as a mixture with the hydrocarbon feeds derived from oil and/or coal is reduced.

Preferably, said feed comprising at least one non-pre-treated bio-oil may advantageously be a mixture of any one of the feeds cited above, said feeds per se having been pre-treated or otherwise.

Hydroreforming

In accordance with the invention, said feed comprising at least one bio-oil, optionally at least one hydrocarbon feed derived from oil and/or coal, optionally other compounds obtained from the biomass, as a mixture with at least a portion of the organic phase of the effluent obtained from the hydroreforming step which is recycled with a recycle ratio equal to the ratio of the mass flow rate of said organic phase to the mass flow rate of the non-pre-treated bio-oil in the range 0.05 to 2, is introduced into said first hydroreforming step.

The reaction here is designated by the term "hydroreforming" because it results in a characteristic change in the molecular weight distribution of the feed comprising at least one bio-oil. Preferably, the hydroreforming step is considered to be a hydrotreatment step in which the bio-oil is partially deoxygenated and partially hydroconverted with a partial production of internal hydrogen within the reaction.

During said first hydroreforming step, the bio-oil is transformed with a view to stabilizing the product, render it miscible with the hydrocarbons, bring about easy separation of the water phase in the bio-oil, reduce its viscosity, reduce its corrosivity, substantially convert the high molecular weight fractions into smaller molecules and reduce its oxygen content from approximately 50% by weight to less than 15% by weight.

The Product from the Hydroreforming Step

In accordance with the invention, said first hydroreforming step can be used to obtain at least one liquid effluent comprising at least one aqueous phase and at least one organic phase.

A gas phase is also advantageously obtained. Said gas phase contains mainly $CO_2$, $H_2S$ and light $C_1$-$C_4$ gases such as methane, for example. Said gas phase may advantageously be separated from said aqueous and organic phases in any separator which is known to the skilled person.

Said aqueous phase and said organic phase are advantageously separated by decanting.

Analysis of the liquid effluent does not show any signs of polymerization.

Said aqueous phase comprises water and may also comprise organic materials, principally acetic acid and methanol (in the case of bio-oil from fast pyrolysis), dissolved in said aqueous phase. The aqueous phase essentially contains water formed by hydrodeoxygenation and water contained in the non-pre-treated bio-oil which has not been converted, and in general less than approximately 20% by weight of dissolved organic materials. For pyrolysis bio-oils, the aqueous phase separated during the first reforming step typically contains approximately 10% by weight of acetic acid and a smaller proportion of methanol. Preferably, the acetic acid and the methanol are recovered in the aqueous phase because they constitute upgradable by-products. The acetic acid may advantageously be recovered by various known means, such as distillation or evaporation, crystallization in the form of a salt, for example an alkaline earth salt, or by solvent extraction using liquid ion exchangers, for example. Because of its low boiling point and absence of the formation of azeotropes with water, the methanol is simply recovered by distillation. Preferably, the acetic acid and the methanol taken together comprise at least 80% by weight of the organic components in the aqueous phase.

The organic phase contains partially deoxygenated bio-oil and hydrocarbons. The term "partially deoxygenated bio-oil" means a bio-oil containing less than 25% by weight of oxygen, preferably less than 15% by weight of oxygen with respect to the total mass of said organic phase. The organic phase thus comprises less than 25% by weight of oxygen, preferably less than 15% by weight of oxygen, more preferably less than 10% by weight of oxygen with respect to the total mass of said organic phase.

Thus, said organic phase is deoxygenated to a sufficient degree to make it miscible with hydrocarbon feeds such as those used in an oil refinery at high concentrations. In general, said organic phase can be freely mixed with the majority of hydrocarbon products at concentrations which may be at least 50% by weight. Further, if the oxygen content is substantially reduced and the bio-oil has already been partially converted, the hydrogen requirements during the hydrotreatment/hydrocracking steps in the refinery are substantially minimized. In addition, said organic phase is stabilized so as to be able to be hydrotreated/hydrocracked in the refinery without running the risk of forming a substantial quantity of solids.

The organic phase preferably contains less than 25% by weight of oxygen, preferably less than 15% by weight of oxygen and less than 5% by weight of water, preferably less than 2% by weight of water with respect to the total mass of said organic phase. The consumption of hydrogen during said first hydroreforming step is preferably less than approximately 2% by weight of the bio-oil.

Preferably, the total acid number (TAN) is less than approximately 100 KOH/g of oil. The total acid number is expressed in mg KOH/g of oil. It is the quantity of potassium hydroxide in milligrams required to neutralize the acids in one gram of oil. Standard methods exist for determining the acid number, such as the ASTM D 974 and DIN 51558 methods (for mineral oils, biodiesels), or methods specific to biodiesels using European standard EN 14104 and ASTM D664, which are in great use worldwide.

The high heat value (HHV) is more than approximately 35 MJ/kg in the organic phase obtained from said first hydroreforming step.

In a non-exhaustive manner, said organic phase may, for example, be used in refining processes such as a hydrocracking, hydrotreatment or catalytic cracking feed or as an industrial fuel.

Said organic phase may also be used directly as a fuel quality hydrocarbon product for land, air or sea transport. In the case in which said organic phase is directly used for sea transport, the quality of the fuels is fairly or very substantially different as a function of the grades under consideration (fuels of the DMX, DMA, DMZ, DMB distillate type or of the RMA, RMB, RMD, RME, RMG or RMK residual fuel type in accordance with ISO 8217) and the particular specifications for these types of fuels mean that the second hydrocracking step is not generally necessary. In contrast, a second hydrotreatment step which operates under less severe conditions, i.e. with a high HSV and under moderate hydrogen pressure, may advantageously be carried out. Preferably, said hydrotreatment step is advantageously operated at a temperature in the range 300° C. to 380° C., at a pressure in the range 3 to 8 MPa and at a HSV in the range 1 to 3 $h^{-1}$.

Typically, during the first hydroreforming step, the yields of organic phase with respect to the dry biomass i.e. comprising 0% humidity, introduced into the pyrolysis step is in the range 15% to 45% by weight, preferably in the range 15% to 40% by weight. The aqueous phase yields with respect to the dry biomass are in the range 10% to 50% by weight, preferably in the range 10% to 40% by weight. The gas phase yields with respect to the dry biomass are in the range 5% to 30% by weight. The conversion of the organic fraction of the bio-oil to partially deoxygenated bio-oil represents at least 70% by weight.

We have also discovered that partially deoxygenated bio-oil, and more particularly the organic phase comprising at least said partially deoxygenated bio-oil produced by hydroreforming, may readily be converted into completely deoxygenated hydrocarbons which are compatible with fuel pools by means of processes carried out in a conventional manner in the refinery, such as hydrotreatment or hydrocracking.

In accordance with the invention, at least a portion of the organic phase of the effluent obtained from the first hydroreforming step is recycled to said first hydroreforming step with a recycle ratio equal to the ratio of the mass flow rate of said organic phase to the mass flow rate of the non-pretreated bio-oil in the range 0.05 to 2 and in which the hydrocarbon effluent obtained from the hydrotreatment and/or hydrocracking step is not recycled to said first hydroreforming step.

Preferably, said recycle ratio is in the range 0.05 to 1.5, more preferably in the range 0.2 to 1.3 and highly preferably in the range 0.3 to 1.

The recycle ratios used mean that overall, a sufficiently thermally stable feed is produced which can be introduced into the preheating furnace along with the hydroreforming reactor without running the risk of clogging, which can facilitate conversion and deoxygenation reactions of the bio-oil on the catalyst, which can improve the dissolution of gaseous hydrogen in the recycled organic phase obtained from the first hydroreforming step and which can provide for better management of the exothermicity generated by the reactions, while minimizing recycling of all or a portion of the organic phase obtained from hydroreforming in order to minimize investment costs as well as operating costs.

The organic phase recycled to said first hydroreforming step and obtained from this step also acts to reduce the density of the partially deoxygenated bio-oil produced during this first step, which facilitates separation of the partially deoxygenated bio-oil phase and the aqueous phase as they leave the hydroreforming step. This separation, which is readily carried out when cooling the reaction mixture, is another advantage brought about by the presence of the organic phase recycled to the reaction mixture of the first hydroreforming step.

Advantageously again, the presence of the organic phase recycled to the reaction mixture tends to expel water from said organic phase, the water content thus also being as reduced as possible, which favours the use of said organic phase as an industrial fuel or as a feed for subsequent hydrotreatment/hydrocracking steps. Thus, said organic phase obtained from the first hydroreforming step contains less than 5% by weight of water, preferably less than 2%.

In accordance with the invention, the catalyst used in the first hydroreforming step preferably comprises at least one transition metal selected from elements from groups 3 to 12 of the periodic classification of the elements and at least one support selected from activated carbon, silicon carbides, silicas, transition aluminas, silica-aluminas, zirconium oxide, cerium oxide, titanium oxide and transition metal aluminates, used alone or as a mixture. Preferably, the catalyst comprises a metal from group 10, used alone or in combination with at least one metal from groups 3 to 12, and preferably at least one metal from groups 5, 6, 8, 9, 10 and 11 of the periodic classification of the elements. Preferably, the catalyst comprises Ni, alone or in combination with at least one metal selected from Cr, Mo, W, Fe, Co and Cu.

The quantity of metal from group 10, preferably nickel, expressed as the percentage by weight of oxide of the metal from group 10, is advantageously in the range 1% to 20% by weight, preferably in the range 5% to 15% by weight with respect to the total mass of said catalyst.

In the case in which said metal from group 10 is used in combination with at least one metal from groups 3 to 12, the quantity of metal from groups 3 to 12 is advantageously in the range 1% to 20% by weight with respect to the total mass of said catalyst.

Preferably, the support is selected from silicas, transition aluminas, silica-aluminas and transition metal aluminates. These supports may be used alone or as a mixture.

Preferred catalysts are Ni, NiCr or NiMn on porous carbon or NiMo on alumina or nickel aluminate.

Preferably, said catalyst is prepared using conventional methods such as co-mixing or impregnation followed by one or more heat treatments.

Said catalyst is advantageously used in the first hydroreforming step in the reduced or sulphurized form.

Operating Conditions

Preferably, said first hydroreforming step is carried out at a temperature in the range 250° C. to 450° C., preferably in the range 250° C. to 400° C., more preferably in the range 270° C. to 360° C., and at an absolute pressure in the range 3.4 to 27.6 MPa (500 to 4000 psi), preferably in the range 3.4 to 20.7 MPa (500 to 3000 psi) and more preferably in the range 6.9 to 2.7 MPa (1000 to 3000 psi) and highly preferably in the range 15 to 20.7 MPa, and at a high hourly space velocity with respect to the bio-oil which is preferably more than $0.2\ h^{-1}$, more preferably in the range $0.5\ h^{-1}$ to $5\ h^{-1}$, and still more preferably in the range $1\ h^{-1}$ to $5\ h^{-1}$.

Preferably, the feed comprising at least the non-pretreated bio-oil is not preheated or only preheated to a temperature of less than 80° C. before being introduced into the first hydroreforming step. In fact, prolonged heating or storage at high temperatures may cause deterioration.

There are no limitations on the equipment for carrying out the process. It may be carried out in a discontinuous or continuous manner. However, for large scale industrial applications, it is preferably operated continuously.

In a preferred embodiment, the hourly space velocity is more than approximately 1 kg of bio-oil per kg of catalyst per hour.

The hydroreforming reaction may be carried out in any reactor which facilitates the effective dispersion of the bio-oil in the reaction mixture. A simple continuously stirred reactor (CSTR) is suitable in discontinuous mode. For continuous applications, co-current trickle bed, moving bed, ebullated bed or slurry reactors are more suitable. Moving bed and ebullated bed reactors have the advantage of allowing ready replacement of the catalyst during continuous operations while keeping the catalyst in the reactor, which provides the operation of the unit with greater flexibility, increases the stream factor and maintains an almost constant activity over time. These technologies also accommodate feeds containing few solids or producing solids during the reactions, which is not the case with fixed bed reactor technologies, unless switchable guard reactors, for example, are used. Slurry reactor technology has the same advantages as moving bed and ebullated bed reactor technologies and the supplemental advantage of operating with a fresh catalyst and thus with a maximum activity, but the disadvantage of substantially complicating the recovery of the catalyst which leaves the reactor with the effluents. Other reactors satisfying the principles mentioned here are within the purview of the skilled person skilled in chemical reactor technology and fall within the scope of the present invention.

Hydrogen Consumption

During the first hydroreforming step, internal reforming of the bio-oil into oxides of carbon and hydrogen occurs with a relatively high yield of hydrocarbons and a relatively low hydrogen consumption. The hydrogen consumption is thus moderate during the first hydroreforming step and the internal production of hydrogen by hydroreforming means that the process can be operated with a very limited external hydrogen consumption.

A portion of the hydrogen necessary for the reaction in the first hydroreforming step is generated internally, a priori from the water present in the bio-oil, by hydroreforming a portion of the bio-oil such that a significant portion of the oxygen is liberated in the form of carbon dioxide, and the net hydrogen requirement is substantially lower than in the case of the direct hydrodeoxygenation process. The other portion of the hydrogen necessary for the reaction is of external origin. Typically, the hydrogen consumption during the first hydroreforming step is less than approximately 2% by weight of the mass of the bio-oil introduced into the reactor, and the corresponding $CO_2$ emission to produce it is much lower than in the case of hydrodeoxygenation (HDO) type processes, with a consumption of at least 4% or 5% by weight of external hydrogen (depending on the quantity of oxygen in the feed).

The hydrogen of external origin may advantageously be supplied from fossil resources, by partial oxidation/gasification or by steam reforming, by steam reforming the bio-oil itself (even though this involves a loss of energy efficiency of the carbon), by steam reforming the methane produced and light gas fractions and/or fractions comprising light oxygen-containing compounds obtained from the first hydroreforming step or the subsequent hydrotreatment/hydrocracking step. It is also possible to react the CO recovered with the water produced to obtain hydrogen using the water gas shift reaction (WGS). Thus, the overall process from biomass to the final hydrocarbon product could be self-sufficient in hydrogen.

Thus, the first hydroreforming step has the following advantages:
- the bio-oil is stabilized so that it can then be refined without the risk of coke formation; it is deoxygenated to a sufficient degree to render it miscible with typical refinery hydrotreatment feeds obtained from oil cuts;
- the oxygen content in the bio-oil is reduced such that the hydrogen requirements during refinery hydrotreatment are substantially reduced to a level which is suitable for conventional processes for the hydrotreatment/hydrocracking of oil products;
- hydrogen is generated internally from the water which is present by hydroreforming a portion of the bio-oil such that the major portion of the oxygen is preferentially liberated in the form of carbon dioxide and the net external hydrogen requirements are limited;
- the product is essentially free of water, the residual water forming a separate phase;
- the corrosivity of the product is substantially reduced in that the major portion of the organic acids is converted or passes into the aqueous phase;
- light carboxylic acids such as acetic acid present in the crude bio-oil can be recovered in the aqueous phase and be upgraded as by-products of value;
- only a moderate quantity of gaseous hydrocarbons, essentially methane, is formed;
- if necessary, this methane fraction can be reformed using a steam methane reforming process (SMR) with a view to producing bio-hydrogen for hydroreforming or hydrotreatment/hydrocracking processes;
- it is also possible to use the bio-coal obtained from the pyrolysis step as a feed for the gasification reactor with a view to producing synthesis gas ($CO+H_2$). This synthesis gas may also be used to produce bio-hydrogen for the hydroreforming and/or hydrotreatment/hydrocracking processes;
- thus, by carrying out the SMR process and/or by gasification of bio-coal, the process for the conversion and upgrading of bio-oil can be self-sufficient in hydrogen without necessitating supplying hydrogen of fossil origin;
- the weight yield of hydrocarbons is higher than that obtained by direct hydrodeoxygenation;
- the operating conditions are relatively moderate and the hourly space velocity is high (residence time shorter compared with conventional hydrodeoxygenation processes) in continuous mode. In addition to increasing the yield of hydrocarbons and reduced hydrogen requirements, the aim is to reduce both investment costs and operating costs in order to upgrade bio-oils with a view to producing a renewable source of chemical products and fuels for transport from whole lignocellulosic biomass.

Hydrotreatment and/or Hydrocracking Step.

Said organic phase comprising at least said partially deoxygenated bio-oil of the effluent obtained from the first hydroreforming step still contains a large content of oxygen, and so it is not a pure hydrocarbon, and as a consequence it requires a subsequent treatment in order to convert it into a fuel quality hydrocarbon product for road, air or sea transport. In the case of upgrading for sea transport, just a hydrotreatment step under mild conditions can advantageously be carried out.

In accordance with the invention, at least a portion of said organic phase comprising at least said partially deoxygenated bio-oil from the effluent obtained from the first hydroreforming step undergoes a second hydrotreatment and/or hydrocracking step. Said second hydrotreatment and/or hydrocracking step is advantageously operated in the presence of hydrogen and a hydrotreatment and/or hydrocracking catalyst at a temperature of more than 200° C., at a pressure in the range 2 MPa to 25 MPa and at an hourly space velocity in the range 0.1 $h^{-1}$ to 20 $h^{-1}$.

At least a portion of said organic phase from the effluent obtained from the first hydroreforming step is optionally introduced into said second hydrotreatment and/or hydrocracking step as a mixture with a feed of fossil origin. Said feed of fossil origin preferably comprises at least 20% by volume of compounds with a boiling point of more than 250° C. and preferably at least 50% by volume of compounds with a boiling point of more than 350° C. Said feed of fossil origin is advantageously selected from atmospheric distillates, vacuum distillates such as distillates obtained from straight run distillation of crude or from conversion units such as fluid catalytic cracking units, cokefaction units or visbreaking units, feeds obtained from aromatic extraction units for lubricant base oils or from solvent dewaxing of lubricant base oils, distillates obtained from processes for hydrotreatment and/or hydroconversion of residues derived from fixed bed or moving bed or ebullated bed or suspended bed hydroconversion of atmospheric residues and/or vacuum residues and/or deasphalted oils obtained from any solvent deasphalting process using light solvents and deasphalted oils or any mixture of the feeds mentioned above. The above list is not limiting. The quantity of n-C7 insolubles in the overall feed is generally less than 5000 ppm, preferably less than 1000 ppm and more preferably less than 200 ppm.

Hydrotreatment

In a preferred embodiment, said second step is a hydrotreatment step operating in the presence of a heterogeneous catalyst and hydrogen at a temperature in the range 250° C. to 450° C., preferably in the range 300° C. to 400° C., more preferably in the range 320° C. to 380° C., at a pressure in the range 2 MPa to 25 MPa, preferably in the range 5 MPa to 20 MPa, and at an hourly space velocity in the range 0.1 $h^{-1}$ to 20 $h^{-1}$, preferably in the range 0.5 $h^{-1}$ to 5 $h^{-1}$, with a total quantity of hydrogen mixed with the feed (including chemical consumption and the recycled quantity) such that the hydrogen/hydrocarbon volume ratio is in the range 100 to 3000 $Nm^3/m^3$, preferably in the range 100 to 1000 $Nm^3/m^3$.

Said hydrotreatment catalyst advantageously comprises an active phase comprising at least one metal from group 6 selected from molybdenum and tungsten alone or as a mixture, preferably associated with at least one metal from groups 8 to 10 selected from nickel and cobalt, alone or as a mixture, and a support selected from the group constituted by alumina, silica, silica-alumina, magnesia, clays and mixtures of at least two of these minerals. Said support may also contain other compounds such as, for example, oxides selected from the group constituted by boron oxide, zirconia, titanium oxide and phosphoric anhydride. Preferably, said support is constituted by alumina, and more preferably by eta, theta, delta or gamma alumina.

The total quantity of oxides of metals from group 6 and groups 8 to 10 in the catalyst which is used is advantageously in the range 5% to 40% by weight, preferably in the range 6% to 30% by weight with respect to the total catalyst mass. In the case in which said catalyst comprises nickel, the quantity of nickel oxide is advantageously in the range 0.5% to 12% by weight, preferably in the range 1% to 10% by weight. In the case in which the catalyst comprises molybdenum, the quantity of molybdenum oxide is advantageously in the range 1% to 35% by weight of molybdenum oxide ($MoO_3$) and preferably in the range 5% to 30% by weight of molybdenum oxide, these percentages being expressed as a % by weight with respect to the total catalyst mass. Said catalyst used in the hydrotreatment step of the method of the invention must advantageously be characterized by a high hydrogenating power so as to drive the selectivity of the reaction as much as possible towards hydrogenation to conserve the number of carbon atoms in the chains, in order to maximize the yield of hydrocarbons in the middle distillate distillation range. The fact of maximizing the hydrogenating function also means that polymerization and/or condensation reactions resulting in coke formation which could degrade the stability of the catalytic performance can be limited. A NiMo, NiW or CoMo catalyst is preferably employed.

Said catalyst used in the second hydrotreatment step may also advantageously contain at least one doping element selected from phosphorus and/or boron. Said element may advantageously be introduced into the matrix or, as is preferable, deposited on the support. It is also possible to deposit silicon on the support, alone or with phosphorus and/or boron. The quantity of oxide in said element is advantageously less than 20%, preferably less than 10% with respect to the total catalyst mass.

The metals of the catalysts deployed in the second hydrotreatment step of the method of the invention may be metals or sulphurized metallic phases. For maximum effectivity, these catalysts based on metallic oxides are usually at least partially converted into metallic sulphides. The catalysts based on metallic oxides may be sulphurized using any technique which is known in the prior art, for example in the reactor (in situ) or ex situ, by bringing the catalyst into contact with a source of hydrogen sulphide such as dimethyldisulphide (DMDS), at high temperature.

Since the biomass normally contains only a small quantity of sulphur, the use of non-sulphurized catalysts should mean that any risk of contamination of the fuels produced by sulphur is avoided. Examples of other catalysts based on metallic oxides which are suitable for the hydrotreatment step which may be cited are metallic phases obtained by reduction under hydrogen. The reduction is generally carried out at temperatures in the range from approximately 150° C. to approximately 650° C., at a hydrogen pressure in the range from approximately 0.1 to approximately 25 MPa (14.5-3625 psi).

Hydrocracking: Mild Hydrocracking and High Pressure Hydrocracking

In another preferred embodiment, said second step is a hydrocracking step which is advantageously operated at a pressure in the range 2 MPa to 25 MPa, at a temperature in the range 250° C. to 480° C., at an hourly space velocity in the range 0.1 $h^{-1}$ to 20 $h^{-1}$ and with a total quantity of hydrogen mixed with the feed (including the chemical consumption and the recycled quantity) such that the hydrogen/hydrocarbon volume ratio is in the range 80 to 5000 $Nm^3/m^3$. Preferably, at least a portion of said organic phase of the effluent obtained from the first hydroreforming step undergoes a second hydrocracking step in the presence of a heterogeneous catalyst and hydrogen.

Said second hydrocracking step may advantageously be carried out in one or two steps in accordance with methods which are known to the skilled person.

In a preferred embodiment, said second hydrocracking step is a mild hydrocracking step. In this case, said second hydrocracking step gives rise to a net conversion of products with a boiling point of less than 375° C. which is advantageously in the range 5% to 50% by weight, advantageously in the range 10% to 45% by weight.

Said second mild hydrocracking step is advantageously operated at a pressure in the range 2 MPa to 12 MPa (290-1740 psi), preferably in the range 2 to 10 MPa (290-1450 psi), more preferably in the range 4 to 9 MPa (580-1305 psi) and still more preferably in the range 3 to 7 MPa (435-1015 psi), at a temperature in the range 350° C. to 450° C., at an hourly space velocity in the range 0.2 $h^{-1}$ to approximately 5 $h^{-1}$ and with a total quantity of hydrogen mixed with the feed (including the chemical consumption and the recycled quantity) such that the hydrogen/hydrocarbon volume ratio is in the range 100 to 2000 $Nm^3/m^3$, preferably in the range 200 to 1500 $Nm^3/m^3$.

In a preferred embodiment, said second hydrocracking step is so-called high pressure hydrocracking. In this case, the operating conditions employed in the process of the invention can result in conversions into products with a boiling point of less than 340° C., preferably less than 370° C., of more than 10% and more, preferably in the range 20% to 95%, more preferably in the range 50% to 95%.

Said second hydrocracking step, known as a high pressure step, is advantageously operated in the presence of hydrogen, at a temperature in the range 250° C. to 480° C., preferably in the range 320° C. to 450° C., more preferably in the range 330° C. to 435° C., at a pressure in the range 5 MPa to 20 MPa (725-2900 psi), the hourly space velocity being in the range 0.1 $h^{-1}$ to 6 $h^{-1}$, preferably in the range 0.2 $h^{-1}$ to 3 $h^{-1}$, and with a quantity of hydrogen introduced such that the hydrogen/hydrocarbon ratio by volume is in the range 100 to 2000 $Nm^3/m^3$.

In accordance with a highly preferred embodiment, said second step is a hydrotreatment step followed by a step for hydrocracking at least a portion of the organic phase of the effluent obtained from the first hydroreforming step.

The hydrotreatment step upstream of the hydrocracking step can be used to reduce heteroatoms which are potentially poisonous for the hydrocracking catalyst(s). The hydrotreatment step is carried out in the presence of a conventional hydrorefining catalyst which is known to the skilled person.

Said second hydrotreatment and/or hydrocracking step may advantageously be carried out in a fixed bed reactor or an "entrained" bed reactor: a moving bed reactor, ebullated bed reactor or suspended bed reactor. It is possible to use a single catalyst or a plurality of different catalysts, simultaneously or in succession, in the case of a fixed bed reactor. Said steps may be carried out on an industrial scale in one or more reactors, with one or more catalytic beds. The reaction exotherm during the hydrotreatment is limited by any method known to the skilled person: recycling the liquid product, cooling with recycled hydrogen, etc.

Said second hydrocracking step may be carried out in one or more fixed or entrained catalytic beds or in a fixed and entrained bed, in one or more reactors, in the context of a hydrocracking layout with one or two steps, as described in the document US 2007/0.209.968, with or without a liquid recycle of the unconverted fraction, optionally in combination with a hydrorefining catalyst upstream of the catalyst of the present invention.

The hydrocracking catalysts used in the second hydrocracking step are all bifunctional in nature, combining an acid function and a hydrodehydrogenating function. The acid function is supplied by substrates which have specific surface areas which are generally in the range 150 $m^2/g$ to 800 $m^2/g$ and a superficial acidity, such as halogenated aluminas (in particular chlorinated or fluorinated), aluminas, zeolites and amorphous silica-aluminas, or combinations thereof. The hydrodehydrogenating function is supplied either by one or more metal from groups 8 to 10 of the periodic classification of the elements, or by a combination of at least one metal from group 6 and at least one metal from groups 8 to 10. The catalyst may comprise metals from groups 8 to 10, for example nickel and/or cobalt, usually in combination with at least one metal from group 6, for example molybdenum and/or tungsten. It is possible, for example, to use a catalyst comprising in the range 0.5% to 10% by weight of nickel (expressed in terms of nickel oxide, NiO) and in the range 1% to 30% by weight of molybdenum, preferably in the range 5% to 25% by weight of molybdenum (expressed in the terms of molybdenum oxide, $MoO_3$), on an amorphous mineral substrate. The total quantity of catalyst as oxides of metal from group 6 and metal from groups 8 to 10 is generally in the range 5% to 40% by weight, preferably in the range 7% to 30% by weight. In the case in which the catalyst comprises at least one metal from group 6 associated with at least one non-noble metal from groups 8 to 10, the catalyst is preferably a sulphurized catalyst.

The catalyst may also contain a promoter element such as phosphorus and/or boron. This element may have been introduced into the matrix or, as is preferable, deposited on the substrate. Silicon may also have been deposited on the substrate, alone or with phosphorus and/or boron. The catalysts preferably contain silicon deposited on a substrate such as alumina, optionally with phosphorus and/or boron deposited on the substrate and also containing at least one metal from groups 8 to 10 (Ni, Co) and at least one metal from group 6 (Mo, W). The concentration of said element is normally less than approximately 20% by weight (oxide base) and usually less than approximately 10% by weight. The concentration of boron trioxide ($B_2O_3$) is normally in the range 0 to 10% by weight.

Other conventional catalysts comprise a FAU type Y zeolite, an amorphous support (generally alumina) and at least one metal or metallic compound having a hydrodehydrogenating function (generally at least one metal from group 6 and from groups 8 to 10, preferably at least one metal from group 6 and at least one non-noble metal from groups 8 to 10).

Other examples of suitable catalysts are catalysts known as composite catalysts, described in US document 2007/0.209.968, which comprise at least one metal or metallic compound having a hydrodehydrogenating function selected from group 6 and groups 8 to 10, a support based on silica-alumina and at least one zeolitic support.

The hydrocracking catalyst preferably comprises at least one metal from groups 8 to 10 selected from Ni and/or Co, and at least one metal from group 6 selected from Mo and/or W, on a support formed from silica-alumina and/or zeolite.

Before injecting the feed, the catalysts employed in the process of the present invention preferably undergo a prior sulphurization treatment in order to transform at least a portion of the oxide species into sulphides before bringing them into contact with the feed to be treated. The sulphurization activation treatment is known to the skilled person and can be carried out using any method which has already been described in the literature, either in situ, i.e. in the reactor, or ex situ.

The hydrocarbon effluent obtained at the end of the second hydrotreatment step and/or hydrocracking step is a liquid hydrocarbon effluent which has been completely deoxygenated. Said liquid hydrocarbon effluent comprises a quantity of hydrocarbon compounds which is advantageously more than 98% by weight, preferably more than 98.9% by weight. Said effluent also advantageously comprises less than 1% by weight of oxygen and less than 0.1% by weight of water with respect to the total mass of said effluent.

The high heat value (HHV) of said liquid hydrocarbon effluent is approximately 45 MJ/kg, which is comparable to that of diesel. The end boiling point for said liquid hydrocarbon effluent, measured by simulated distillation using gas chromatography, in accordance with ASTM method D 2887, for example, is less than approximately 500° C., preferably less than 450° C.

The overall yield of liquid hydrocarbon effluent obtained at the end of the second hydrotreatment and/or hydrocracking step with respect to the dry biomass is advantageously in the range 10% to 48% by weight, preferably in the range 10% to 40% by weight. The hydrogen consumption during the second step is preferably less than 2% by weight with respect to the mass of bio-oil introduced. This is equivalent to a hydrogen consumption during the second step which is preferably less than 4% by weight with respect to the mass of organic effluent sent to said second step.

Said liquid hydrocarbon effluent obtained from the second hydrotreatment and/or hydrocracking step advantageously undergoes a distillation step in order to obtain fuel base cuts which can be incorporated into the gas oil, kerosene pool.

Figure 1 illustrates the process of the invention.

The bio-oil obtained from fast pyrolysis of the biomass is introduced via the line 1 as a mixture with hydrogen at 3 and the organic phase 8 obtained from the hydroreforming step in the first hydroreforming zone 2. The liquid effluent obtained from the hydroreforming zone via the line 4 is introduced into a separator 5. A gas phase mainly containing $CO_2$, $H_2S$ and light $C_1$-$C_4$ gases such as methane is separated via the line 7, and an aqueous phase is also separated via the line 6. An organic phase containing the partially deoxygenated bio-oil and hydrocarbons is withdrawn via the line 8 and a portion of said organic phase is recycled to the hydroreforming zone. The portion of said organic phase which is not recycled is then sent to a second hydrotreatment and/or hydrocracking zone 9. The liquid hydrocarbon effluent obtained from the second hydrotreatment and/or hydrocracking zone 10 then undergoes a distillation step to obtain at least fuel base cuts 12, 13, 14, which can be incorporated into the gas oil, kerosene pool.

The examples below illustrate the invention without limiting its scope.

The experiments were carried out with a bio-oil obtained by fast pyrolysis of hardwood mixtures. The operating conditions for the fast pyrolysis were: a temperature of 500° C. and a residence time for the vapours of the order of a second. Table 1 below presents the data obtained following analysis of this bio-oil.

TABLE 1

| Analysis of bio-oil | |
|---|---|
| Density at 20° C., g/cm$^3$ | 1.21 |
| Kinematic viscosity at 20° C., mm$^2$/s | 182.6 |
| pH | 2.5 |
| High heat value, MJ/kg [a] | 18.03 |
| Low heat value, MJ/kg [b] | 16.46 |
| Water content, % by weight | 20.7 |
| Pyrolytic lignin, % by weight | 19.0 |
| Carbon, % by weight | 43.9 |
| Hydrogen, % by weight | 7.39 |
| Nitrogen, % by weight | <0.05 |
| Oxygen, % by weight | 47.3 |
| Sulphur (ppm) | 92 |

[a] The high heat value was measured using a calorimetric bomb,
[b] The low heat value was calculated using the following equation: LHV (J/g) = HHV (J/g) − 218.13 * H % (% by weight)

EXAMPLE 1

Preparation of Hydroreforming Catalysts C1 and C2

Catalyst C1 was a catalyst with formulation NiCr/C. The nickel and chromium precursors, in their nitrate forms (respectively Ni(NO$_3$)$_2$ and Cr(NO$_3$)$_3$), were supplied by Aldrich. The support was an activated carbon in the form of cylindrical extrudates supplied by Norit (RX3 Extra). This catalyst C1 was obtained by dry impregnation of an aqueous solution containing the nickel and chromium precursors. The volume of the solution was equal to the water take-up volume of the support (i.e. the maximum volume of water which can penetrate into its pores). The concentrations of nickel and chromium precursors in solution were determined so as to obtain the target contents on the final catalyst: 10% by weight of nickel and 5% by weight of chromium. After impregnation of this aqueous solution, the catalyst was left to mature at ambient temperature for 4 hours in a vessel saturated with water, then oven dried at 70° C. in air for 3 hours and finally underwent a heat treatment at 300° C. for 3 hours in nitrogen (at a flow rate of 1.5 L/h/g of catalyst).

Catalyst C2 had the formulation NiMo/δ-alumina. The support was a transition alumina with a delta structure and was in the form of trilobal extrudates. This support was obtained by dehydration of boehmite into transition alumina. Firstly, the boehmite powder underwent a mixing/extrusion step in order to obtain boehmite in the form of a trilobal extrudate. The δ-alumina catalyst support was finally obtained after calcining the formed boehmite in air at 900° C. The target contents for this catalyst were respectively 6% by weight for the nickel and 5% by weight for the molybdenum. The synthesis protocol consisted of carrying out dry impregnation of a solution of ammonium heptamolybdate and nickel nitrate. The concentrations of the precursors in the solution were adjusted so as to deposit the quantities by weight of the metals on the support. The solid was left to mature at ambient temperature for 12 hours in a water-saturated vessel, then oven dried at 120° C. in air for 3 hours. Finally, the solid was calcined at 500° C. for 2 hours in a stream of air (at a flow rate of 1 L/h/g of catalyst).

TABLE 1

| Formulation of catalysts C1 and C2 | | |
|---|---|---|
| Catalyst | C1 | C2 |
| Support | Activated carbon | Alumina |
| Ni (% by weight) | 10.2 | 6.3 |
| Cr (% by weight) | 4.9 | — |
| Mo (% by weight) | — | 5.1 |

EXAMPLE 2

Production of a Liquid Hydrocarbon from a Non-pre-treated Bio-oil with a Recycle Ratio of 0.33

This example illustrates the production of an oxygen-free hydrocarbon liquid from a non-pre-treated bio-oil feed with the characteristics described in Table 1 mixed with an organic liquid phase obtained from the first hydroreforming step in a ratio of 1:3 (liquid organic phase: bio-oil), simulating a recycle ratio of 0.33. The feed containing the non-pre-treated bio-oil was initially introduced into the autoclave reactor with a hydroreforming catalyst for the first hydroreforming step.

15 g of the catalyst C1 prepared in accordance with Example 1 was reduced in a reduction cell at 300° C. for 3 h in 30 NL/h of hydrogen then introduced, in an inerted glove box, into a basket which was placed in the autoclave reactor with 75 g of bio-oil and 25 g of the liquid organic phase obtained from the hydroreforming step. The reactor was tightly sealed and purged with nitrogen then with hydrogen. The reactor was then placed under a pressure of 4.83 MPa (700 psia) with 18.37 NL of $H_2$, then gradually heated with stirring to 330° C. and maintained at this temperature for 3 hours during which the maximum pressure reached was 13.9 MPa (2016 psia). The equivalent hourly space velocity, defined as the ratio of the volume of bio-oil introduced over the product of the volume of the catalyst and the test duration, was equal to 0.7 h$^{-1}$. The reactor was then rapidly cooled and brought to ambient temperature, which reduced the pressure to 1.17 MPa (170 psia). The gas phase of the reaction product, 4.9 NL in total, was sent to a collecting bottle and analysed. Analysis by gas phase chromatography indicated that it contained 63.9% of $H_2$, 21.6% of $CO_2$, 10.6% of $CH_4$ and 3.0% of CO by volume.

The basket containing the catalyst was recovered apart from the liquid produced, which was separated into 50.33 g of an upper homogeneous organic liquid oil phase with a density of 980 kg/m$^3$ and 38.37 g of a lower aqueous phase. No tar deposits were observed in the reactor. The organic liquid phase contained 13.93% by weight of elemental oxygen and 4.68% by weight of water (2.36 g) determined by elemental analysis and Karl-Fischer testing.

The overall net consumption of hydrogen reached 15.26 NL (1.39 g), which corresponded to approximately 1.85% by weight with respect to the mass of bio-oil introduced. From the above data, the yields of organic liquid phase and aqueous phase were determined to be 27.8% and 21.2% by weight respectively, based on the dry biomass containing 0% humidity.

The organic liquid phase obtained from the hydroreforming step was then sent to a flushed fixed bed reactor in the presence of a conventional hydrotreatment catalyst for the second hydrotreatment step (HDT). The hydrotreatment catalyst used comprised 4.3% by weight of NiO, 21% by weight of $MoO_3$ and 5% by weight of $P_2O_5$ supported on a gamma alumina. Prior to the test, this catalyst was sulphurized in situ at a temperature of 350° C., using a feed containing heptane supplemented with 2% by weight of dimethyldisulphide (DMDS).

25 mL/h of the organic liquid phase obtained from the hydroreforming step was introduced into an isothermal fixed bed reactor charged with 25 mL of hydrotreatment catalyst. The corresponding hourly space velocity was equal to 1 h$^{-1}$. 800 Nm$^3$ of hydrogen/m$^3$ of feed was introduced into the reactor maintained at a temperature of 320° C. and at a pressure of 10 MPa (1450 psia). In order to maintain the catalyst in the sulphurized state, 50 ppm by weight of sulphur was added to the feed in the form of DMDS. Under the reaction conditions, the DMDS was completely decomposed to form methane and $H_2S$.

The test was operated for 1 h and was able to recover 19.63 g of a liquid hydrocarbon phase with a density of 842 kg/m3, containing 0.12% by weight of water, 0.2% by weight of elemental oxygen (analyser quantification limit) and 99.7% by weight of hydrocarbons. The net consumption of hydrogen corresponded to 2.2% by weight with respect to the mass of the organic effluent sent to the hydrotreatment step, which corresponded to a net consumption of hydrogen of 0.9% by weight with respect to the bio-oil. The overall yield of liquid hydrocarbon was equal to 21.4% by weight based on the dry biomass.

These results show that a completely deoxygenated hydrocarbon product in accordance with the invention can be obtained by hydroreforming bio-oil with a recycle ratio for the organic effluent obtained from the hydroreforming step of 0.33 and the catalyst C1, followed by a hydrotreatment of the organic effluent obtained from the hydroreforming step without recycling hydrocarbon product obtained from the hydrotreatment step to the hydroreforming step.

EXAMPLE 3

Production of a Liquid Hydrocarbon from a Non-pre-treated Bio-oil with a Recycle Ratio of 1

This example reprised the conditions of Example 2, with the exception that the non-pre-treated bio-oil was introduced as a mixture with the organic liquid phase obtained from the hydroreforming step with a ratio of 1:1, simulating a recycle ratio of 1, and the hydroreforming catalyst was different.

15 g of the catalyst C2 prepared in accordance with Example 1 was reduced in a reduction cell at 400° C. for 3 h in 30 NL/h of hydrogen then introduced, in an inerted glove box, into a basket which was placed in the autoclave reactor with 50 g of bio-oil and 50 g of the liquid organic phase obtained from the hydroreforming step. The reactor was tightly sealed and placed under a pressure of 6.7 MPa (971 psia) with 25.43 NL of $H_2$, then gradually heated with stirring to 330° C. and maintained at this temperature for 3 hours during which the maximum pressure reached was 17.3 MPa (2509 psia). The equivalent hourly space velocity, defined as the ratio of the volume of bio-oil introduced over the product of the volume of the catalyst and the test duration, was equal to 0.8 h$^{-1}$. The reactor was then rapidly cooled and brought to ambient temperature, which reduced the pressure to 3.1 MPa (449 psia). The gas phase of the reaction product, 18.63L NTP in total, was evacuated and analysed. Analysis by gas phase chromatography indicated that it contained 85.9% of $H_2$, 6.9% of $CO_2$, 0.9% of CO, 2.2% of $CH_4$ and 3.1% of C2+ by volume.

The basket containing the catalyst was recovered apart from the liquid produced, which was separated into 70.43 g of an upper homogeneous organic liquid oil phase with a density of 950 kg/m$^3$ and 22.78 g of a lower aqueous phase. No tar deposits were observed in the reactor. The organic liquid phase contained 9.74% by weight of elemental oxygen and 0.98% by weight of water (0.84 g) determined by elemental analysis and Karl-Fischer testing.

The overall net consumption of hydrogen reached 9.45 NL (0.844 g), which corresponded to approximately 1.69% by weight based on the bio-oil which had been reacted. From the above data, the yields of organic liquid phase and aqueous phase were determined to be 31.6% and 10.2% by weight respectively, based on the dry biomass containing 0% humidity.

The second step for hydrotreatment of the organic liquid phase obtained from the hydroreforming step was carried out using the operating conditions described in Example 3. The hydrotreatment catalyst of Example 3 was used for this example. Prior to the test, it was sulphurized in situ at a temperature of 350° C. using a heptane feed supplemented with 2% by weight of dimethyldisulphide (DMDS). 50 ppm by weight of sulphur in the form of DMDS was also added to the feed to keep the catalyst in the sulphurized state.

21.34 g of a liquid hydrocarbon phase with a density of 830 kg/m$^3$, containing 0.01% by weight of water, 0.2% by weight of elemental oxygen (analyser quantification limit) and 99.8% by weight of hydrocarbons was recovered after operating the test for 1 hour. The net consumption of hydrogen corresponded to 1.8% by weight with respect to the mass of the organic effluent sent to the hydrotreatment step, which corresponded to a net consumption of hydrogen of 0.8% by weight with respect to the bio-oil. The overall yield of liquid hydrocarbon was equal to 25.6% by weight based on the dry biomass.

These results show that a completely deoxygenated hydrocarbon product in accordance with the invention can be obtained by hydroreforming bio-oil with a recycle ratio for the organic effluent obtained from the hydroreforming step of 1 and a catalyst C2, followed by a hydrotreatment of the organic effluent obtained from the hydroreforming step without recycling hydrocarbon product obtained from the hydrotreatment step to the hydroreforming step.

The invention claimed is:

1. A process for the production of hydrocarbon products from a feed comprising at least one non-pre-treated bio-oil, wherein the process comprises:
   a first step for hydroreforming the feed in the presence of hydrogen and a hydroreforming catalyst comprising at least one transition metal selected from elements from groups 3 to 12 of the periodic classification of the elements and at least one support selected from activated carbon, silicon carbides, silicas, transition aluminas, silica-aluminas, zirconium oxide, cerium oxide, titanium oxide and transition metal aluminates, used alone or as a mixture, in order to obtain at least one liquid effluent comprising at least one aqueous phase and at least one organic phase; and
   a second step for hydrotreatment and/or hydrocracking of at least a portion of the organic phase obtained from the first step for hydroreforming in order to obtain a hydrocarbon effluent,
   in which at least a portion of the organic phase obtained from the first step for hydroreforming is recycled to said first step for hydroreforming as a mixture with said feed, with a recycle ratio equal to the ratio of the mass flow rate of said organic phase to the mass flow rate of the non-pre-treated bio-oil in the range 0.05 to 2 and in which the hydrocarbon effluent obtained from the second step for hydrotreatment and/or hydrocracking is not recycled to said first step for hydroreforming.

2. The process as claimed in claim 1, in which said recycle ratio is in the range 0.05 to 1.5.

3. The process as claimed in claim 2, in which said recycle ratio is in the range 0.2 to 1.3.

4. The process as claimed in claim 3, in which said recycle ratio is in the range 0.3 to 1.

5. The process as claimed in claim 1, in which the non-pre-treated bio-oil is produced by fast pyrolysis starting from a biomass feed.

6. The process as claimed in claim 1, in which said hydroreforming catalyst comprises Ni, alone or in combination with at least one metal selected from Cr, Mo, W, Fe, Co and Cu.

7. The process as claimed in claim 1, in which the support for said hydroreforming catalyst is selected from silicas, transition aluminas, silica-aluminas and transition metal aluminates, used alone or as a mixture.

8. The process as claimed in claim 1, in which said hydroreforming catalyst is a Ni, NiCr or NiMn catalyst on porous carbon or NiMo on alumina or nickel aluminate.

9. The process as claimed in claim 1, in which said first hydroreforming step is carried out at a temperature in the range 250° C. to 450° C., at an absolute pressure in the range 3.4 to 27.6 MPa and at an hourly space velocity of more than $0.2\ h^{-1}$.

10. The process as claimed in claim 1, in which said second step for hydrotreatment and/or hydrocracking is operated in the presence of hydrogen and a hydrotreatment and/or hydrocracking catalyst at a temperature of more than 200° C., at a pressure in the range 2 MPa to 25 MPa and at an hourly space velocity in the range $0.1\ h^{-1}$ to $20\ h^{-1}$.

11. The process as claimed in claim 10, in which at least a portion of said organic phase obtained from the first step for hydroreforming is introduced into said second step for hydrotreatment and/or hydrocracking as a mixture with a feed of fossil origin.

12. The process as claimed in claim 1, in which said second step for hydrotreatment and/or hydrocracking is a hydrotreatment step operated in the presence of a heterogeneous catalyst and hydrogen at a temperature in the range 250° C. to 450° C., at a pressure in the range 2 MPa to 25 MPa, and at an hourly space velocity in the range $0.1\ h^{-1}$ to $20\ h^{-1}$.

13. The process as claimed in claim 1, in which said second step for hydrotreatment and/or hydrocracking is a hydrocracking step operated in the presence of a heterogeneous catalyst and hydrogen at a pressure in the range 2 MPa to 25 MPa, at a temperature in the range 250° C. to 480° C., at an hourly space velocity in the range $0.1\ h^{-1}$ to $20\ h^{-1}$, and with a total quantity of hydrogen mixed with the feed such that a hydrogen/hydrocarbon volume ratio is in the range 80 to 5000 $Nm^3/m^3$.

14. The process as claimed in claim 13, in which said second step for hydrotreatment and/or hydrocracking is a hydrotreatment step followed by a step for hydrocracking at least a portion of the organic phase obtained from the first hydroreforming step.

* * * * *